Figure 1:
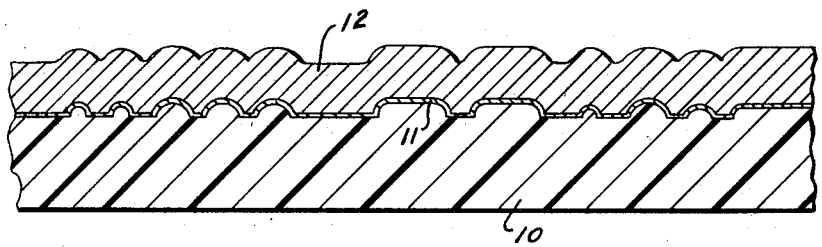

Jan. 28, 1969    A. GRANDINETTI ET AL    3,424,635
METHOD OF MAKING COMPOSITE PRINTING PLATE
Filed March 28, 1966

INVENTORS
ATTILIO GRANDINETTI
RALPH CURD
JAMES DIMEN
BY
MORGAN, FINNEGAN, DURHAM & PINE
ATTORNEYS 3,424,635
METHOD OF MAKING COMPOSITE
PRINTING PLATE
Attilio Grandinetti, Villa Park, Ill., Ralph B. Curd, Orange, Conn., and James Dimen, Woodmere, N.Y., assignors to Electrographic Corporation, New York, N.Y., a corporation of Delaware
Filed Mar. 28, 1966, Ser. No. 537,941
U.S. Cl. 156—150                  3 Claims
Int. Cl. B41n 3/00; C23b 7/00

The present invention relates to a novel and improved process of producing composite electrotype printing plates.

Objects and advantages of the invention will be set forth in part hereinafter and in part will be obvious herefrom, or may be learned by practice with the invention, the same being realized and attained by means of the steps, process and compositions pointed out in the appended claims.

The invention consists in the novel steps, process, compositions and improvements herein shown and described.

The accompanying drawings, referred to herein and constituting a part hereof illustrate one embodiment of the invention and together with the description, serve to explain the principles of the invention.

Heretofore, electrotype printing plates have been produced by forming a mold on a sheet of a thermoplastic material, such as ozokorite, chicle, wax or a vinyl resin, all of which are thermoplastic.

In the conventional manner of removal of the electrodeposited shell from the mold, the edges of outline halftones and vignettes were inevitably distorted and curled to minimize this damage, the shells were often made relatively thick, which also enabled them better to resist subsequent pressure applied during the backing operation. This operation was a relatively expensive one and did not fully solve the distortion problem, nor did it solve the subsequent problems which appear in the normal methods of backing-up the shell.

The present invention solves many of the problems of the prior art and produces a superior electrotype at a considerable saving over the prior commercially acceptable processes.

The present invention has for an object the provision of a novel and improved process of producing relief electrotype printing plates for letter-press printing which are more faithful reproductions of their originals, than has heretofore been commercially practical. A further object is the provision of a process of producing high quality electrotypes in a more economical manner. Still another object is the provision of an improved process of producing a high quality electrotype to form the printing face of a composite printing plate more rapidly and more economically than has heretofore been possible. The invention also almost completely eliminates dishing and distortion of the dead metal areas on the shell thereby reducing the amount of routing required on the finished plate.

According to the process of the present invention, there is provided a flat sheet of a thermosetting resin in an incompletely curved stage and this is made into an electrotype mold by conventional use of heat and pressure while the original letter-press engraving in zinc or copper, line or halftone is molded into the face of the heated resin sheet. Heat and pressure are continued until the resin of the mold has set to a hard, rigid, heat-resistant mold, which is dimensionally stable and not subject to further dimensional change under either the heat or moisture to which it is later subjected. When the mold is fully set, it is carefully stripped from the original engraving.

The mold is then readied for production of the electrotype shell, preferably by an initial spray of mixed silver-depositing liquids, as conventionally used in the production of electrotype shells. Thereafter, the silver coated mold may be provided with a very thin electrodeposited layer of chromium and/or nickel, after which the mold is coated with a layer of electrodeposited copper which is of a thickness of from 0.007" to 0.012". In view of the heat-resistant nature of the mold, greater than usual economies may be obtained by reason of the fact that the copper electrodeposition may be faster than normal, necessitating higher operating temperatures.

When the desired thin electrotype shell has been produced, the shell, still supported on its mold, is removed from the plating bath, thoroughly rinsed and dried. Thereafter, the back of the shell is prepared for backing, usually by being coated with a thin layer of a strong adhesive, after which the electrotype is backed with a layer of a thermoplastic adhesive. The thermoplastic adhesive is preferably brushed on as a liquid over the back of the shell, but for best adhesion and complete filling of the back of the electrotype shell, it is often preferable to apply to the adhesive coated backs a thin coating of the thermoplastic ABS resin in the form of a fine powder and to level the powder layer before application of the thermoplastic ABS sheet. Thereafter, the mold, shell and ABS resin assembly are placed on the lower platen of a hydraulic press, one or both platens of which are heated, the assembly is surrounded by gauge blocks of the desired height, after which the upper platen is brought down into powerful contact with the assembly, and it is thus subjected to heat and pressure to mold the backing resins and adhere them to the shell at the same time that the backing layer is provided with a relatively flat surface.

The consolidated shell backed with its adherent resilient layer of ABS resin is then removed from the press and cooled. When cool, the backed shell is machined while still supported on its mold, to reduce it to the desired thickness.

The machined, backed shell is then carefully removed from its mold, the backing on the shell serving to prevent dishing and other damage to the face of the shell due to the support given the shell by its backing layer.

After removal of the backed shell from its mold, the backed shell is curved, placed in the convex mold of a press, and mounted on a relatively rigid arcuate base member usually an aluminum base, to form a printing member of the desired thickness and curvature. Usually the backed shell is trimmed and pre-registered prior to mounting.

By the use of a thermosetting resin for the mold, and by backing the electrotype shell before it is removed from its mold, great advantages are secured, compared with the conventional processes. The plating bath may be operated at 145°, which is higher than normal temperatures, thereby producing shells faster and at a lower cost. Also, because the shells are backed before being removed from their molds, they may be removed from the mold without distortion of their faces, and the shells are much thinner than is required for equally good quality shells which are removed from the mold before being backed. During the backing of the shell, the strong mold resists pushing or raising of the open or non-printing areas of the shell, thereby greatly reducing subsequent routing of the face of the finished plate. Additionally if the original plate has been made-ready, with its full tone areas above its high-light areas, this same difference in printing height is maintained until the plate-mounting has been completed.

The thermoset resin for the mold is preferably a solid sheet of partially cured thermosetting resin, such as a phenolicformaldehyde, urea-formaldehyde or other thermosetting resin, in an intermediate partially cured condition, while the resin is still thermoplastic and may be thermoset by the application of heat and pressure during the molding operation.

The thermoplastic or resilient resin backing layer in powder or sheet form, is preferably formed of an acrylonitrile-butadiene-styrene resin generally referred to as "ABS" which is thermoplastic, has some flexibility and resiliency and is readily adhered to the back of the shell as well as to the convex face of the final arcuate mounting member.

Bonding of the backed, curved shell to its relatively rigid arcuate backing member is accomplished with suitable application of heat and pressure.

It will be understood that the foregoing general description and the following detailed description as well are exemplary and explanatory of the invention but are not restrictive thereof.

Figure 2:
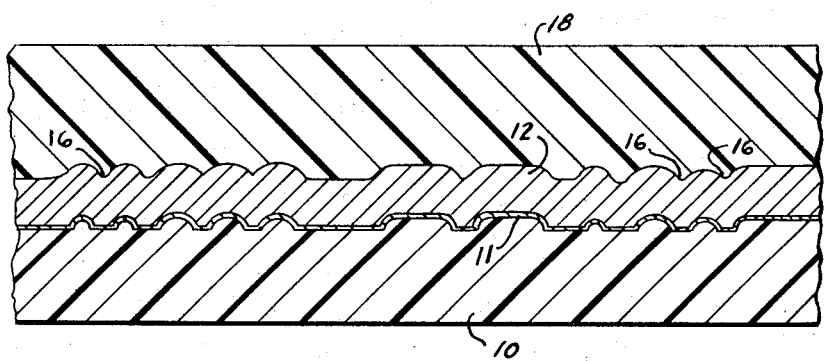
Figure 3:
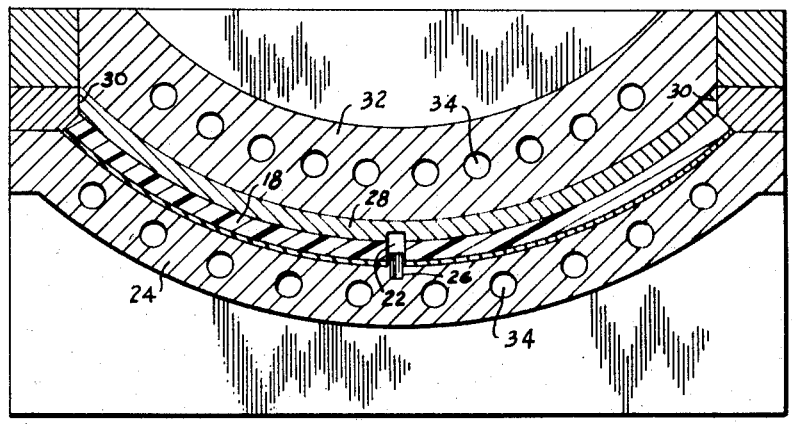

Of the drawings:

FIGURE 1 is a schematic sectional view of an electrotype mold on which an electrotype shell has been electrodeposited;

FIGURE 2 is a schematic cross-sectional view showing a fragmentary enlarged section of the ABS resin backed shell supported on its thermoset resin mold, after the backing has been consolidated with the electrodeposited shell; and FIGURE 3 is a schematic cross-sectional view showing a fragmentary enlarged section of an ABS resin backed shell which has been machined and curved, and is positioned in a saddle press to bond the backed shell to a rigid arcuate backing member under heat and pressure.

Referring now in detail to the accompanying drawings and the present preferred and illustrative embodiment of the present invention, the drawings show schematically several steps in the performance of the present invention.

In FIGURE 1, there is shown an electrotype mold 10 which is formed of a hard, substantially rigid, thermoset, thermosetting resin, such as a phenol-formaldehyde, a urea-formaldehyde or other thermosetting resin usually initially about 0.030" thick where a halftone relief photoengraving is to be reproduced. The molded sheet of resin is subjected to heavy pressure with the photoengraved plate on its face, usually between the heated platens of a hydraulic pressure, and heat and pressure are continued until the resin has been properly molded and transformed into a fully set condition.

Thereafter, the photoengraved plate is removed from the mold, and the face of the mold is prepared for electrodeposition of the electrotype shell. For this purpose, the face of the mold is initially coated with a thin layer of silver 11, as by conventional spraying techniques, thereby rendering the face of the mold electro-conductive.

The silver coated mold is then placed on a conventional electrotyper's case and connected to be the cathode in the metal plating bath. Initially, the silver layer is usually provided with a thin deposit of chromium or nickel, after which it is provided with a thicker deposit of electrolytic copper 12.

In view of the thermoset mold, higher current densities may be used than are normal, in spite of the higher than usual operating temperatures of the bath, and by reason of the fact that the shell is to be backed before being released from the mold, much thinner shells than are normal may be used, thereby speeding up the process and making for great economy of operation.

Shells for use in the present invention need be only 0.007" to 0.012" thick, and at the higher plating temperatures they are produced in about one-half the time now required for the production of thicker conventional shells.

The shell 12 and its mold 10 are then removed from the case, and the back of the shell is preferably coated with a thin layer of adhesive over its entire back surface. Many different types of adhesive are suitable and the adhesive should be chosen so as to be appropriate to produce a strong bond with the ABS resin with which the shell is to be backed. Where the backing resin is a liquid acrylo-nitrile-butadiene-styrene resin, a nitrile-rubber phenolic resin adhesive is preferred such as Pittsburgh Plate Glass Company nitrile-rubber adhesive No. 379.

The adhesive coated shell 12, supported on its mold 10 is then moved to the heated lower flat platen of a hydraulic press. Preferably, the adhesive coated back of the shell is provided with a thin layer of a powdered ABS resin, usually about 100 mesh or finer, which serves to fill in the small cavities 16 on the back of the shell, which cavities might otherwise trap air and prevent a uniform bond with the thicker plastic backing layer. The backing layer may be completely formed of powdered resin, but it is preferably formed from a sheet of ABS resin 18 which is slightly larger than the back of the shell 12.

The mold 10, shell 12 and backing layer 18, supported on the heated platen are then subjected to heat and pressure by the upper heated platen of the hydraulic press, which heat and pressure are continued for the time required, usually several minutes, to mold the backing layer 18 and to compact the powdered resin if used, so that the backing is securely adhesively bonded to the back of the shell 12.

The thermoplastic ABS backing is preferably thick enough to provide a backing about 0.030" after it has been subjected to heat and pressure.

The ABS backing resin has good compressive strength, good tensile strength, is not subject to fracture under impact and preferably has a moderate degree of resiliency and flexibility. All of these criteria are well satisfied by the ABS resin sold by B. F. Goodrich Chemical Company.

When the bonding operation has been completed, the backed shell 12, still supported on its mold is machined, as by shaving in a Claybourn shaver, while being held down by vacuum on the bed of the shaver. The backed shell is thus reduced to the desired thickness.

Thereafter, the backed shell is removed from its mold, which is easily accomplished by carefully stripping the shell away from the rigid mold. The shell is then trimmed to the desired size and is provided with registering holes 22 which enable the plate to be preregistered on its backing member.

The ABS backing layer 18 is then warmed, preferably by infra-red radiant heaters, to render it flexible, after which it is bent to the desired cylindrical curvature and is placed in the cylindrically concave bed portion 24 of a bonding press with the registering holes 22 positioned on registering pins 26.

An accurately cylindrically curved, rigid metal back member 28, of the proper size and curvature, preferably having its edges 30 properly bevelled, is coated on its convex face with adhesive so that it may be bonded to the machined back surface of the backing layer 18.

The adhesive may be applied as a thin solid sheet of adhesive such as Pittsburgh Plate Glass #379 adhesive in dry form, which is initially supported on a backing sheet of release paper and is pressed into contact with the convex surface of the metal back member 28 and heated to bond the adhesive to the metal. Thereafter, the release paper is removed to expose the adhesive for bonding to the back 18 of the backed shell.

The metal back member 28, provided with holes to fit over pre-registering pins 26 is then placed in the bonding press and the upper convex member 32 is lowered to bring the convex member 32 into contact with the metal back member 28 and to bond the member 28 to the backing layer 18. The press members 24 and 32 are preferably provided with passages 34 through which heating and cooling fluids may be circulated and during the first few minutes of the bonding operation, hot fluid is circulated, after which the passages 34 are provided with circulating cold water to set the adhesives, all while the upper and lower members 24 and 32 are powerfully pressed towards each other.

If it is desired to form a flat composite printing plate instead of a parti-cylindrical plate, the final bonding operation is carried out between heated flat hydraulic press platens, using a flat metal back member in place of the curved member 28.

When cool, the composite printing plate comprising the shell 12, backing layer 18 and backing member 28 may be removed from the bonding press and are ready to be placed on the printing press.

The invention in its broader aspects is not limited to the specific steps, process and compositions shown and described but departures may be made therefrom within the scope of the accompanying claims without departing from the principles of the invention and without sacrificing its chief advantages.

What is claimed is:

1. A process of making a composite printing plate which comprises molding a relief printing plate into a mass of a thermosetting resin, curing the resin under heat and pressure to provide a flat electrotype mold, separating the mold from the printing plate, electrodepositing a thin electrotype shell on the face of the mold, coating the back of the shell with an adhesive, covering the back of the shell with a layer of an acrylonitrile-butadiene-styrene thermoplastic resin, subjecting the cured mold, shell and thermoplastic resin layer to heat and pressure to bond said thermoplastic resin to the shell, separating the backed shell from the mold, and adhesively securing the backed shell to a rigid metal base under heat and pressure.

2. The process according to claim 1 in which the back of the shell is initially coated with a layer of a thermally sensitive adhesive and the back of the shell is provided with a thin layer of finely divided particles of said thermoplastic resin to fill in the surface irregularities on the back of the shell.

3. The process according to claim 1 in which the backed shell is heated and cylindrically curved and is then bonded under heat and pressure to an adhesively coated, curved, rigid metal backing layer.

References Cited

UNITED STATES PATENTS

| | | | |
|---|---|---|---|
| 2,400,518 | 5/1946 | Kreber et al. | 204—6 |
| 2,670,325 | 2/1954 | Bungay | 204—6 |
| 3,350,250 | 10/1967 | Sanz et al. | 156—150 |
| 3,356,598 | 12/1967 | Cabau | 204—15 |

EARL M. BERGERT, *Primary Examiner.*

MARTIN L. KATZ, *Assistant Examiner.*

U.S. Cl. X.R.

101—395; 204—6; 156—232, 233, 235, 245; 264—220